(12) United States Patent
Fukuda et al.

(10) Patent No.: US 12,412,909 B2
(45) Date of Patent: Sep. 9, 2025

(54) COOLING SYSTEM

(71) Applicants: DENSO CORPORATION, Kariya (JP); HINO MOTORS, LTD., Hino (JP); TOYOTA JIDOSHA KABUSHIKI KAISHA, Toyota (JP)

(72) Inventors: Kentaro Fukuda, Kariya (JP); Ryosuke Yamada, Kariya (JP); Shunjiro Kikawa, Kariya (JP); Hisashi Higashi, Hino (JP); Hiroya Kawasaki, Hino (JP); Masahiro Kimura, Hino (JP); Ryuya Takahashi, Toyota (JP)

(73) Assignees: DENSO CORPORATION, Kariya (JP); HINO MOTORS, LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 604 days.

(21) Appl. No.: 17/857,530

(22) Filed: Jul. 5, 2022

(65) Prior Publication Data

US 2023/0011420 A1    Jan. 12, 2023

(30) Foreign Application Priority Data

Jul. 7, 2021 (JP) ................. 2021-112961

(51) Int. Cl.
*H01M 8/04029* (2016.01)
*H01M 8/04007* (2016.01)
*H01M 8/04701* (2016.01)
*H01M 8/04746* (2016.01)

(52) U.S. Cl.
CPC ... *H01M 8/04029* (2013.01); *H01M 8/04074* (2013.01); *H01M 8/04723* (2013.01); *H01M 8/04768* (2013.01); *H01M 2250/20* (2013.01)

(58) Field of Classification Search
CPC .... H01M 2250/20; B60K 11/04; B60L 50/70; B60L 58/33
See application file for complete search history.

(56) References Cited

U.S. PATENT DOCUMENTS

| | | | |
|---|---|---|---|
| 6,186,254 B1* | 2/2001 | Mufford | H01M 8/04723 429/465 |
| 2002/0127448 A1* | 9/2002 | Derflinger | H01M 8/04029 429/434 |
| 2006/0086547 A1 | 4/2006 | Shimada et al. | |
| 2009/0218966 A1 | 9/2009 | Shimada et al. | |
| 2010/0133025 A1* | 6/2010 | Flett | B60L 7/14 180/65.21 |

\* cited by examiner

*Primary Examiner* — Matthew W Van Oudenaren
(74) *Attorney, Agent, or Firm* — Nixon & Vanderhye, P.C.

(57) ABSTRACT

A cooling system for cooling a fuel cell on a vehicle includes a radiator, a branch portion connected to an outlet side of the radiator, a confluence portion connected to an inlet side of the radiator, a first passage and a second passage connected in parallel between the confluence portion and the branch portion, a fuel cell and a first pump provided in the first passage, a resistor and a second pump provided in the second passage, and a backflow preventer provided in the second passage. The first passage has no backflow preventer.

2 Claims, 7 Drawing Sheets

COOLING SYSTEM

CROSS REFERENCE TO RELATED APPLICATION

This application is based on Japanese Patent Application No. 2021-112961 filed on Jul. 7, 2021, the disclosure of which is incorporated herein by reference.

TECHNICAL FIELD

The present disclosure relates to a cooling system for cooling a fuel cell mounted on a vehicle.

BACKGROUND

A cooling system cools a resistor for a brake by blowing air from a blower. The cooling system is installed in a vehicle in which a generator is driven by an internal combustion engine as a power source and the generated power is used to drive an electric motor. The resistor converts the electric power into heat energy when a braking operation is conducted to rotation of wheels mechanically connected to the electric motor.

SUMMARY

According to an aspect of the present disclosure, a cooling system that cools a fuel cell for a vehicle includes:
  a radiator configured to radiate heat of a coolant, the radiator having a radiator inlet for a coolant to flow in and a radiator outlet for a coolant to flow out;
  an outlet passage connected to the radiator outlet for a coolant flowing out of the radiator;
  an inlet passage connected to the radiator inlet for a coolant flowing toward the radiator;
  a branch portion provided in the outlet passage for branching into a plurality of passages for a coolant;
  a confluence portion provided in the inlet passage for merging the plurality of passages into one passage;
  a first passage and a second passage, as the plurality of passages, connected in parallel with each other between the branch portion and the confluence portion, a coolant flowing from the branch portion toward the confluence portion;
  a fuel cell provided in the first passage, the fuel cell having a fuel cell inlet for a coolant to flow in and a fuel cell outlet for a coolant to flow out, a coolant flowing inside the fuel cell, the fuel cell generating electric power by an electrochemical reaction of fuel;
  a first pump provided in the first passage to pump a coolant;
  a resistor provided in the second passage for a brake, the resistor having a resistor inlet for a coolant to flow in and a resistor outlet for a coolant to flow out, a coolant flowing inside the resistor, the resistor converting an electric power generated by a motor generator into a heat energy by a braking operation to rotation of a wheel mechanically connected to the motor generator;
  a second pump provided in the second passage to pump a coolant; and
  a backflow preventer provided in the second passage as a mechanical component different from the second pump, so as to prevent a coolant from flowing inside the resistor in a reverse direction from the resistor outlet to the resistor inlet.

The first passage has no backflow preventer as a mechanical component different from the first pump to prevent a coolant from flowing inside the fuel cell in a reverse direction from the fuel cell outlet to the fuel cell inlet.

DESCRIPTION OF EMBODIMENTS

To begin with, examples of relevant techniques will be described.

A cooling system that cools a resistor for a brake by blowing air from a blower. The cooling system is installed in a vehicle in which a generator is driven by an internal combustion engine as a power source and the generated power is used to drive an electric motor. The resistor converts the electric power into heat energy when a braking operation is conducted to rotation of wheels mechanically connected to the electric motor.

The present inventors have examined a cooling system for cooling each of a fuel cell mounted on a vehicle and a resistor for a brake by heat exchange using a coolant. The cooling system is called as a first cooling system.

The first cooling system includes: a radiator that radiates heat of a coolant; an outlet passage connected to an outlet of the radiator for the coolant; an inlet passage connected to an inlet of the radiator for the coolant; a branch portion provided downstream of the outlet passage; a confluence portion provided upstream of the inlet passage; a first passage and a first passage connected in parallel with each other between the branch portion and the confluence portion; a fuel cell and a first pump provided in the first passage; and a resistor for a brake and a second pump provided in the second passage. Each of the first pump and the second pump sends the coolant by rotation of the impeller.

According to the first cooling system, one radiator is used for the combination of the fuel cell and the resistor. The one radiator is used for radiating heat of both of the coolant received from the fuel cell and the coolant received from the resistor. Therefore, the cooling system can be downsized as compared with a case where the cooling system separately includes a radiator for the fuel cell and a radiator for the resistor.

Further, according to the first cooling system, the fuel cell and the resistor are connected in parallel relative to the one radiator. The pumps are provided respectively for the fuel cell and the resistor to pump the coolant. Therefore, it is easy to control the flow rate of the coolant flowing through the fuel cell and the flow rate of the coolant flowing through the resistor to a target flow rate.

However, the frequency of cooling the resistor is lower than the frequency of cooling the fuel cell. Therefore, it may not be necessary to cool the resistor while it is necessary to cool the fuel cell. In this case, the first pump operates and the second pump stops. As a result, while a part of the coolant flowing out of the fuel cell flows through the radiator, the other part of the coolant flowing out of the fuel cell flows backward in the second passage and flows into the fuel cell without flowing through the radiator. The present inventors found that the heat dissipation capacity of the radiator is not sufficiently exerted for cooling the fuel cell.

In view of the above points, it is an object of the present disclosure to provide a cooling system capable of sufficiently exerting the heat dissipation capacity of the radiator for cooling the fuel cell.

According to an aspect of the present disclosure, a cooling system that cools a fuel cell for a vehicle includes:
a radiator configured to radiate heat of a coolant, the radiator having a radiator inlet for a coolant to flow in and a radiator outlet for a coolant to flow out;
an outlet passage connected to the radiator outlet for a coolant flowing out of the radiator;
an inlet passage connected to the radiator inlet for a coolant flowing toward the radiator;
a branch portion provided in the outlet passage for branching into a plurality of passages for a coolant;
a confluence portion provided in the inlet passage for merging the plurality of passages into one passage;
a first passage and a second passage, as the plurality of passages, connected in parallel with each other between the branch portion and the confluence portion, a coolant flowing from the branch portion toward the confluence portion;
a fuel cell provided in the first passage, the fuel cell having a fuel cell inlet for a coolant to flow in and a fuel cell outlet for a coolant to flow out, a coolant flowing inside the fuel cell, the fuel cell generating electric power by an electrochemical reaction of fuel;
a first pump provided in the first passage to pump a coolant;
a resistor provided in the second passage for a brake, the resistor having a resistor inlet for a coolant to flow in and a resistor outlet for a coolant to flow out, a coolant flowing inside the resistor, the resistor converting an electric power generated by a motor generator into a heat energy by a braking operation to rotation of a wheel mechanically connected to the motor generator;
a second pump provided in the second passage to pump a coolant; and
a backflow preventer provided in the second passage as a mechanical component different from the second pump, so as to prevent a coolant from flowing inside the resistor in a reverse direction from the resistor outlet to the resistor inlet.

The first passage has no backflow preventer as a mechanical component different from the first pump to prevent a coolant from flowing inside the fuel cell in a reverse direction from the fuel cell outlet to the fuel cell inlet.

Accordingly, the backflow preventer is provided in the second passage having the resistor. Therefore, when the second pump is stopped and the first pump is operating, a part of the coolant flowing out from the fuel cell is prevented from flowing backward in the second passage, such that all the coolant flowing out from the fuel cell can flow through the radiator. As a result, the heat dissipation capacity of the radiator can be fully exerted for cooling the fuel cell.

When it is necessary to cool the resistor but the fuel cell does not need to be cooled, the second pump is operated for cooling the resistor and the first pump is stopped. At this time, if a part of the coolant flowing out of the resistor flows back through the first passage and flows into the resistor without flowing through the radiator, the heat dissipation capacity of the radiator cannot be fully used for cooling the resistor. From the viewpoint of fully exerting the heat dissipation capacity of the radiator for cooling the resistor, it is conceivable to provide a backflow preventer in the first passage for the fuel cell in addition to the second passage for the resistor.

However, the amount of heat radiation required for the resistor is less than the amount of heat radiation required for the fuel cell. Therefore, even if a part of the coolant flowing out of the resistor flows back through the first passage and the heat dissipation capacity of the radiator is not sufficiently exerted for cooling the resistor, the influence is small compared with a case of cooling the fuel cell.

Rather, in case where a backflow preventer is provided in the first passage, the pressure loss of the coolant is increased by the backflow preventer when the coolant flows through the first passage, while the first pump is operated to cool the fuel cell. Therefore, in order to secure the same flow rate of the coolant flowing through the first passage as in the case where the backflow preventer is not provided, it is necessary to increase the rotation speed of the first pump provided in the first passage. This causes decrease in the life of the first pump and deterioration in the fuel efficiency. Further, the number of components needed for the cooling system is increased by providing the backflow preventer. Since the cooling system is mounted on the vehicle, it is better to have few components as the cooling system.

Therefore, according to the first aspect of the present disclosure, the backflow preventer is not provided in the first passage for the fuel cell. As a result, the pressure loss generated in the coolant flowing through the first passage can be reduced as compared with a case where the backflow preventer is provided in the first passage. Further, the number of components needed for the cooling system can be reduced as compared with a case where the backflow preventer is provided in both the first passage and the second passage.

The reference numerals attached to the components and the like indicate an example of correspondence between the components and the like and specific components and the like described in embodiments to be described below.

Hereinafter, embodiments of the present disclosure will be described with reference to the drawings. In the following embodiments, the same or equivalent parts are denoted by the same reference numerals.

First Embodiment

Figure 1:
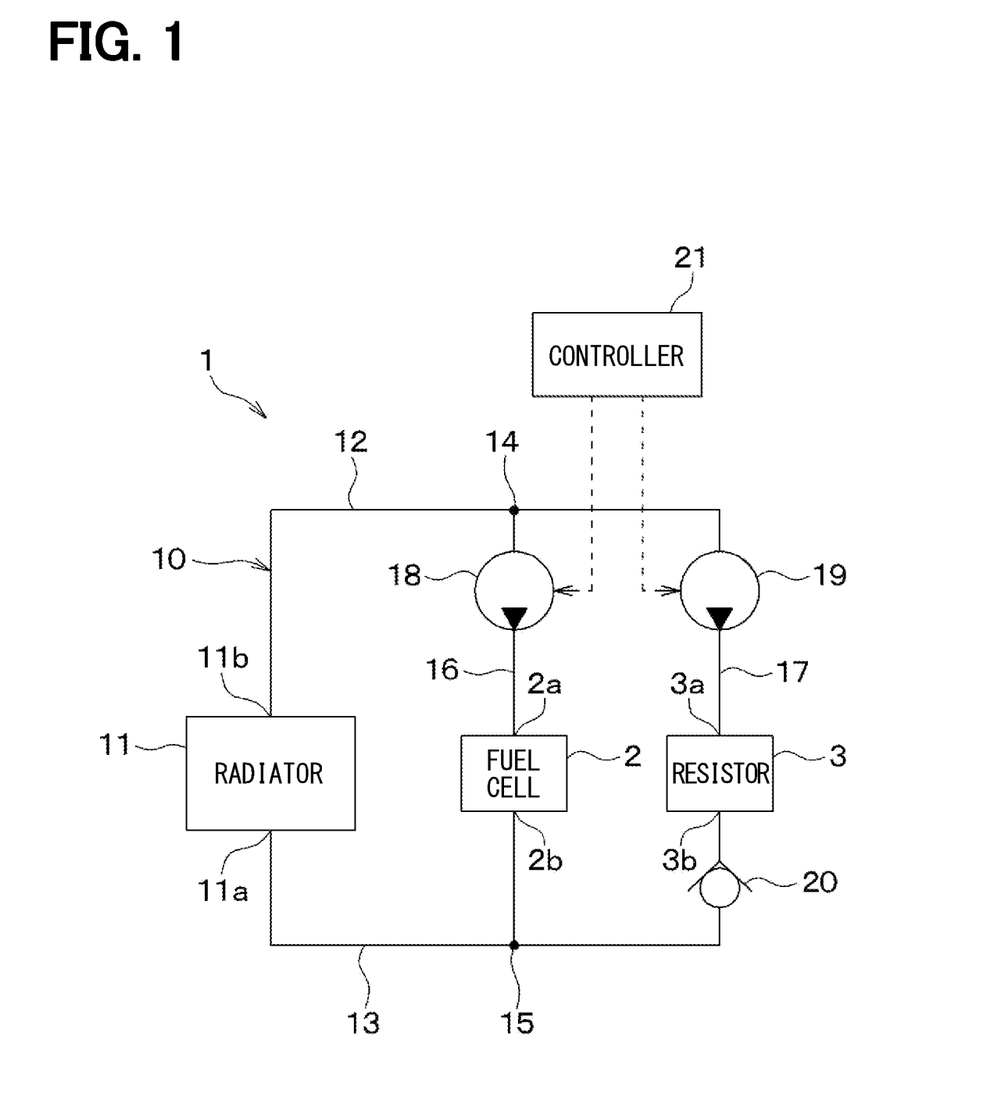
FIG. 1 is a schematic diagram showing a cooling system according to a first embodiment.

A cooling system 1 of the present embodiment shown in FIG. 1 is mounted on a large commercial vehicle such as a truck, a bus, or a trailer with a fuel cell. A vehicle equipped with a fuel cell is referred to as a fuel cell vehicle. The cooling system 1 cools a fuel cell 2 and a resistor 3 mounted on the large commercial vehicle with a coolant.

The fuel cell 2 generates electric power by an electrochemical reaction of fuel. As the fuel cell 2, a solid polymer type fuel cell is used. The electric power generated by the fuel cell 2 is used to drive a motor generator (such as an electric motor, not shown) mounted on the fuel cell vehicle. By driving the motor generator, the wheels mechanically connected to the motor generator rotate, and the propulsive force is obtained for driving the fuel cell vehicle.

The resistor 3 is for a brake, and converts the electric power generated by the motor generator into heat energy. The motor generator generates electricity by braking against the rotation of the wheels when the fuel cell vehicle decelerates. When the battery can be charged, the power generated by the motor generator is charged into the battery. When the battery cannot be charged due to a fully charged state or the like, the electric power generated by the motor generator is supplied to the resistor 3.

The coolant is a heat exchange medium in a liquid state. The coolant is used in the liquid state when the fuel cell 2 and the resistor 3 are cooled. The coolant does not include refrigerant for a refrigeration cycle, which changes its state between the liquid and the gas during use.

The cooling system 1 includes a coolant circuit 10 through which the coolant circulates. The coolant circuit 10 includes a radiator 11, an outlet passage 12, an inlet passage 13, a branch portion 14, a confluence portion 15, a first passage 16, a second passage 17, the fuel cell 2, a first pump 18, the resistor 3, a second pump 19, and a check valve 20.

The radiator 11 radiates heat of the coolant by a heat exchange between the coolant and air. The radiator 11 has a coolant inlet 11a and a coolant outlet 11b. The coolant inlet 11a is a radiator inlet for the coolant to flow into the radiator 11. The coolant outlet 11b is a radiator outlet for the coolant to flow out from the radiator 11.

The outlet passage 12 is connected to the coolant outlet 11b of the radiator 11. The coolant flowing out of the coolant outlet 11b flows through the outlet passage 12. The inlet passage 13 is connected to the coolant inlet 11a of the radiator 11. The coolant flows through the inlet passage 13 toward the radiator 11.

The branch portion 14 is provided downstream of the outlet passage 12 in a flow of the coolant. The branch portion 14 branches the outlet passage 12 for the coolant into plural passages such as a first passage 16 and a second passage 17. The confluence portion 15 is provided upstream of the inlet passage 13. The confluence section 15 merges the plural passages into one passage.

The first passage 16 and the second passage 17 are connected in parallel with each other between the branch portion 14 and the confluence portion 15. The first passage 16 and the second passage 17 are plural passages through which the coolant flows from the branch portion 14 toward the confluence portion 15. One end of the first passage 16 and one end of the second passage 17 are connected to the branch portion 14. The other end of the first passage 16 and the other end of the second passage 17 are connected to the confluence portion 15.

The fuel cell 2 is provided in the middle of the first passage 16. The fuel cell 2 has a coolant inlet 2a and a coolant outlet 2b. The coolant inlet 2a is a fuel cell inlet for the coolant to flow into the fuel cell 2. The coolant outlet 2b is a fuel cell outlet for the coolant to flow out of the fuel cell 2. The coolant flows inside the fuel cell 2. That is, the fuel cell 2 has an internal passage (not shown) formed inside the fuel cell 2. The coolant flows from the coolant inlet 2a toward the coolant outlet 2b through the internal passage of the fuel cell 2. When the coolant flows through the internal passage of the fuel cell 2, the coolant receives heat from the fuel cell 2. That is, the fuel cell 2 radiates the heat to the coolant.

The first pump 18 is provided in the middle of the first passage 16. Specifically, the first pump 18 is provided at a position between the branch portion 14 and the fuel cell 2 in the first passage 16. That is, the first pump 18 is provided upstream of the fuel cell 2 in a flow of the coolant in the first passage 16. The first pump 18 has a casing (not shown) and an impeller (not shown). The first pump 18 is a non-volumetric electric pump that sends a coolant by rotating the impeller in the casing.

The resistor 3 is provided in the middle of the second passage 17. The resistor 3 has a coolant inlet 3a and a coolant outlet 3b. The coolant inlet 3a is a resistor inlet for the coolant to flow into the resistor 3. The coolant outlet 3b is a resistor outlet for the coolant to flow out of the resistor 3. The coolant flows inside the resistor 3. That is, the resistor 3 has an internal passage (not shown) inside the resistor 3. The coolant flows from the coolant inlet 3a toward the coolant outlet 3b through the internal passage of the resistor 3. When the coolant flows through the internal passage of the resistor 3, the coolant receives heat from the resistor 3. That is, the resistor 3 radiates the heat to the coolant.

The second pump 19 is provided in the middle of the second passage 17. Specifically, the second pump 19 is provided at a position between the branch portion 14 and the resistor 3 in the second passage 17. That is, the second pump 19 is provided upstream of the resistor 3 in a flow of the coolant in the second passage 17. The second pump 19 is a non-volumetric electric pump that sends a coolant by rotating an impeller in a casing, similarly to the first pump 18.

The check valve 20 is provided in the middle of the second passage 17. The check valve 20 is a mechanical component different from the second pump 19, and is a backflow preventer for preventing the backflow of the coolant in the second passage 17. The backflow of the coolant in the second passage 17 means that the coolant flows in the second passage 17 in the reverse direction from the coolant outlet 3b toward the coolant inlet 3a, inside the resistor 3. The check valve 20 is provided at a position between the coolant outlet 3b of the resistor 3 and the confluence portion 15 in the second passage 17. The position where the check valve 20 is provided is not limited to this. The check valve 20 may be provided at any position of the second passage 17.

The cooling system 1 includes a control device 21. The control device 21 controls the operation of each of the first pump 18 and the second pump 19.

Specifically, when it is necessary to cool the fuel cell 2 with the coolant and it is not necessary to cool the resistor 3 with the coolant, the control device 21 operates the first pump 18 and stops the second pump 19. As a result, the coolant discharged from the first pump 18 flows in order of the fuel cell 2 and the radiator 11, and then is sucked into the first pump 18. At this time, the coolant receives heat from the fuel cell 2 and radiates the heat in the radiator 11. As a result, the fuel cell 2 is cooled.

When it is necessary to cool the resistor 3 with the coolant and it is not necessary to cool the fuel cell 2 with the coolant, the control device 21 operates the second pump 19 and stops the first pump 18. As a result, the coolant discharged from the second pump 19 flows in order of the resistor 3 and the radiator 11, and then is sucked into the second pump 19. At this time, the coolant receives heat from the resistor 3 and radiates the heat in the radiator 11. Thus, the resistor 3 is cooled.

When the fuel cell 2 needs to be cooled and the resistor 3 needs to be cooled, the control device 21 operates the first pump 18 and the second pump 19. As a result, the coolant discharged from the first pump 18 flows through the fuel cell 2, and the coolant discharged from the second pump 19 flows through the resistor 3. The coolant flowing out of the fuel cell 2 and the coolant flowing out of the resistor 3 merge at the confluence portion 15 and flow into the radiator 11. The coolant flowing out of the radiator 11 branches at the branch portion 14 and is sucked into each of the first pump 18 and the second pump 19. Thus, the fuel cell 2 and the resistor 3 are cooled.

Next, the effect of the cooling system 1 of the present embodiment will be described.

(1) The cooling system 1 includes the radiator 11, the outlet passage 12, the inlet passage 13, the branch portion 14, the confluence portion 15, the first passage 16, the second passage 17, the fuel cell 2, the first pump 18, the resistor 3, and the second pump 19.

In a comparison example, if the cooling system separately has a radiator for the fuel cell for radiating the coolant received from the fuel cell 2 and a radiator for the resistor for radiating the coolant received from the resistor 3, the cooling system becomes large.

In contrast, the cooling system of the present embodiment includes one radiator 11 for the combination of the fuel cell 2 and the resistor 3. The one radiator is shared for radiating heat of both of the coolant received from the fuel cell 2 and the coolant received from the resistor 3. Therefore, the cooling system 1 can be downsized compared with a case where the cooling system includes a radiator for a fuel cell and a radiator for a resistor separately.

Figure 2:
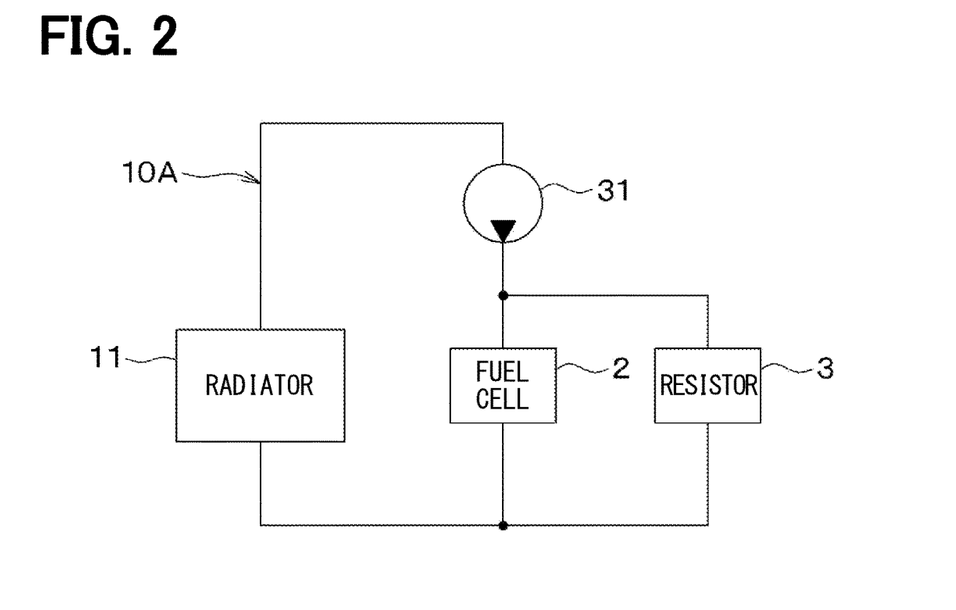
FIG. 2 is a schematic diagram showing a cooling system of Comparative Example 1.

Further, as a cooling system different from the present embodiment, a cooling system of Comparative Example 1 shown in FIG. 2 is be considered. The cooling system of Comparative Example 1 includes a coolant circuit 10A in which a fuel cell 2 and a resistor 3 are connected in parallel to one radiator 11. In the coolant circuit 10A, only one pump 31 is connected between the radiator 11 and the fuel cell 2 and the resistor 3 connected in parallel. In the cooling system of Comparative Example 1, it is difficult to control each of the flow rate of the coolant flowing through the fuel cell 2 and the flow rate of the coolant flowing through the resistor 3 to target values.

In contrast, in the cooling system 1 of the present embodiment, the first pump 18 and the second pump 19 are provided for the fuel cell 2 and the resistor 3, respectively. Therefore, it is easy to control each of the flow rate of the coolant flowing through the fuel cell 2 and the flow rate of the coolant flowing through the resistor 3 to the target values.

(2) The cooling system 1 includes the check valve 20 provided in the second passage 17. The first passage 16 is not provided with a check valve. The first passage 16 has no backflow preventer as a mechanical component different from the first pump 18, which prevents the coolant from flowing in a reverse direction from the coolant outlet $2b$ to the coolant inlet $2a$, inside of the fuel cell 2.

Figure 3:
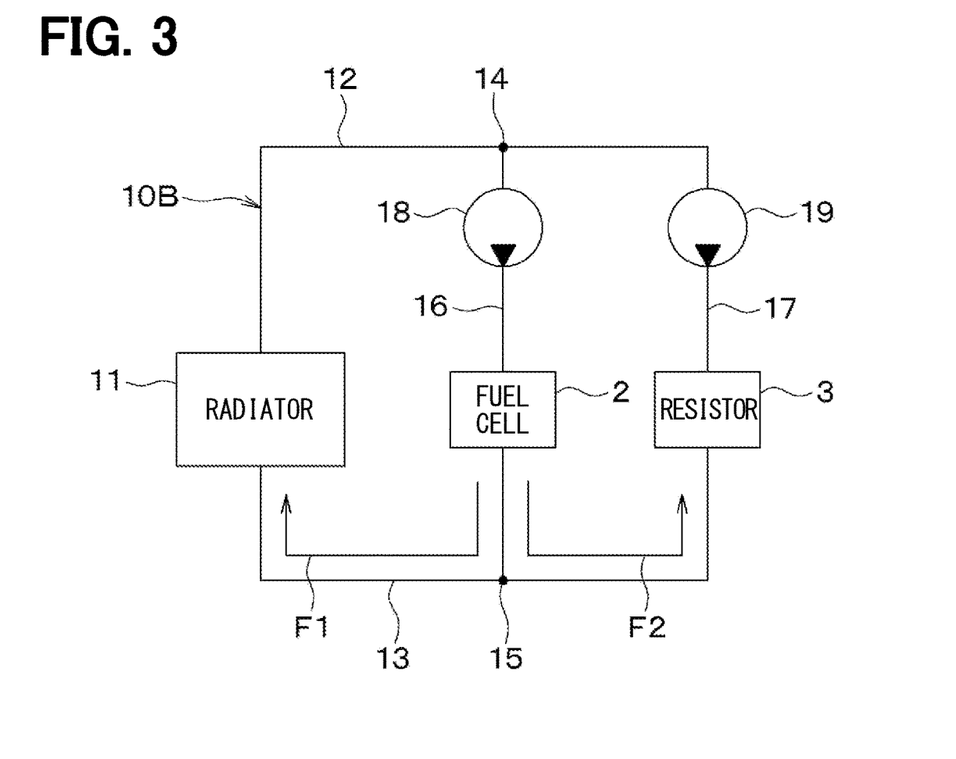
FIG. 3 is a schematic diagram showing a cooling system of Comparative Example 2.

As a cooling system different from the present embodiment, a cooling system of Comparative Example 2 shown in FIG. 3 is considered. In the cooling system of Comparative Example 2, the fuel cell 2 and the resistor 3 are connected in parallel to one radiator 11, and a coolant circuit 10B is provided with a first pump 18 and a second pump 19 respectively for the fuel cell 2 and the resistor 3 as in the present embodiment. In the coolant circuit 10B, unlike the coolant circuit 10 of the present embodiment, the check valve 20 is not provided in the second passage 17.

The frequency of cooling the resistor 3 is lower than the frequency of cooling the fuel cell 2. Therefore, it may not be necessary to cool the resistor 3 while it is necessary to cool the fuel cell 2. In this case, the control device 21 operates the first pump 18 and stops the second pump 19. As a result, in the cooling system of Comparative Example 2, as shown by the arrow F1 in FIG. 3, a part of the coolant flowing out from the fuel cell 2 flows through the radiator 11. The second pump 19 is a non-volumetric pump having an impeller. Therefore, as shown by the arrow F2 in FIG. 3, the other part of the coolant flowing out of the fuel cell 2 flows back in the second passage 17 and flows into the fuel cell 2 without flowing through the radiator 11. As a result, the present inventors found that the heat dissipation capacity of the radiator 11 is not sufficiently exerted for cooling the fuel cell 2.

In contrast, according to the cooling system 1 of the present embodiment, the check valve 20 is provided in the second passage 17. Therefore, it is possible to prevent the coolant flowing out of the fuel cell 2 from flowing backward through the second passage 17 when the second pump 19 is stopped and the first pump 18 is operating. All of the coolant flowing out of the fuel cell 2 can flow to the radiator 11. As a result, the heat dissipation capacity of the radiator 11 can be sufficiently exerted for cooling the fuel cell 2.

When the resistor 3 needs to be cooled and the fuel cell 2 does not need to be cooled, the second pump 19 operates for cooling the resistor 3 and the first pump 18 stops. At this time, when a part of the coolant flowing out from the resistor 3 flows back into the first passage 16 and flows into the resistor 3 without flowing through the radiator 11, the heat dissipation capacity of the radiator 11 is not fully exhibited for cooling the resistor 3. Therefore, from the viewpoint of sufficiently exerting the heat dissipation capacity of the radiator 11 for cooling the resistor 3, it is conceivable to provide a check valve in the first passage 16 in the cooling system 1 of the present embodiment. This check valve is a backflow preventer for preventing the coolant from flowing in the reverse direction.

However, the amount of heat radiation required for the resistor 3 is smaller than the amount of heat radiation required for the fuel cell 2. Therefore, even if the heat dissipation capacity of the radiator 11 is not sufficiently exerted for cooling the resistor 3, since a part of the coolant flowing out of the resistor 3 flows back through the first passage 16, the influence is small, compared with a case of cooling the fuel cell 2.

Rather, if a check valve is provided in the first passage 16, the pressure loss of the coolant is increased by the check valve when the coolant flows through the first passage 16, while the first pump 18 is operated for cooling the fuel cell 2. Therefore, in order to secure the same flow rate of the coolant flowing through the first passage 16 as in the case where the check valve is not provided, the rotation speed of the first pump 18 provided in the first passage 16 need to be increased. This causes issues such as a decrease in the life of the first pump 18 and a deterioration in the fuel efficiency. Further, by providing the check valve in the first passage 16, the number of components needed for the cooling system is increased. Since the cooling system is mounted on the vehicle, it is better to have few components of the cooling system. These are the same even when a backflow preventer other than the check valve is provided in the first passage 16.

Therefore, according to the cooling system 1 of the present embodiment, the first passage 16 is not provided with a backflow preventer such as check valve. As a result, the pressure loss generated in the coolant flowing through the first passage 16 can be reduced as compared with a case where the check valve or the like is provided in the first passage 16. Further, the number of components needed for the cooling system 1 can be reduced as compared with a case where a check valve or the like is provided in both the first passage 16 and the second passage 17.

Second Embodiment

Figure 4:
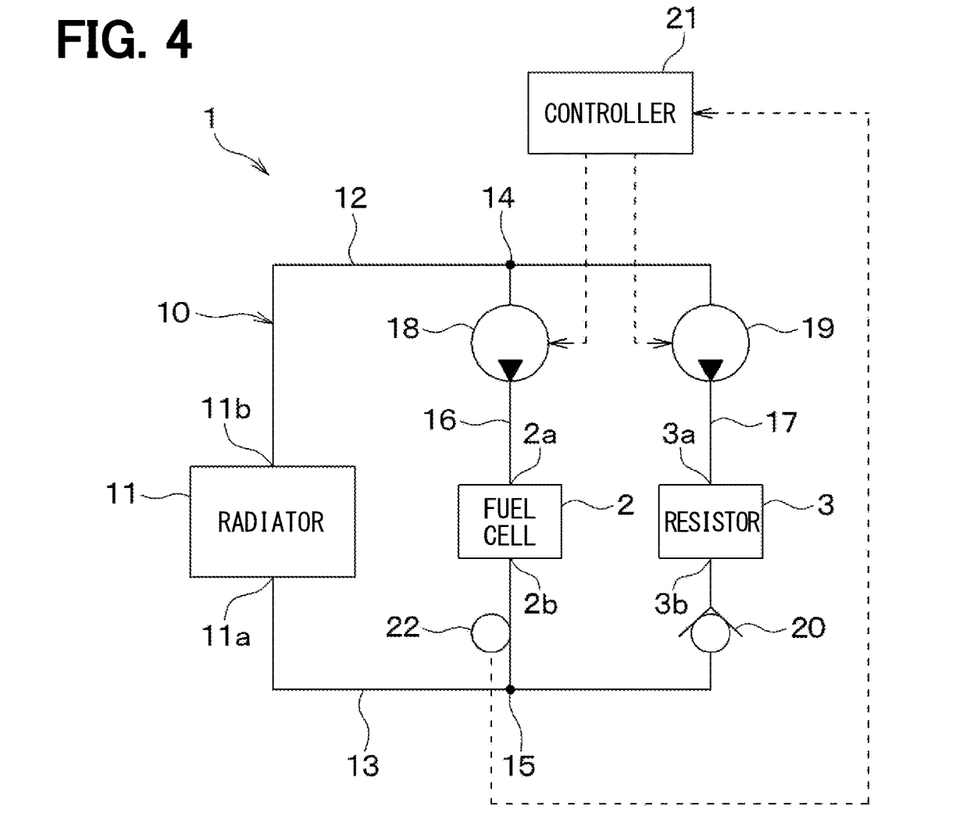
FIG. 4 is a schematic diagram showing a cooling system according to a second embodiment.

As shown in FIG. 4, the present embodiment differs from the first embodiment in that the cooling system 1 includes a flow meter 22. Further, the present embodiment is different from the first embodiment in that the control device 21 controls the operation of the first pump 18 based on the measurement result of the flow meter 22 when the second pump 19 is operating. Other configurations of the cooling system 1 are the same as those of the first embodiment.

The flow meter 22 measures the flow rate of the coolant flowing through the first passage 16. The flow meter 22 may be of any measurement type such as an electromagnetic type and an ultrasonic type. The flow meter 22 is provided at a position in the first passage 16 between the fuel cell 2 and the confluence portion 15. The position where the flow meter 22 is provided may be between the first pump 18 and the fuel cell 2 in the first passage 16. Further, the position where the flow meter 22 is provided may be between the branch portion 14 and the first pump 18 in the first passage 16.

The flow meter 22 is connected to the input side of the control device 21. The control device 21 can acquire the measurement result of the flow meter 22. The control device 21 controls the rotation speed of the first pump 18. By controlling the rotation speed of the first pump 18 by the control device 21, the discharge capacity of the first pump 18 is adjusted.

When it is necessary to cool the resistor 3 with the coolant and it is not necessary to cool the fuel cell 2 with the coolant, the control device 21 operates the second pump 19 and operates the first pump 18. At this time, the control device 21 operates the second pump 19 at a predetermined rotation speed so that the flow rate of the coolant flowing through the second passage 17 becomes the flow rate required for cooling the resistor 3. The control device 21 operates the first pump 18 at a rotation speed lower than a rotation speed of the first pump 18 necessary for cooling the fuel cell 2.

Further, the control device 21 controls the rotation speed of the first pump 18 based on the measurement result of the flow meter 22 so that the coolant flows in the first passage 16 in the forward direction. The forward direction is a direction in which the coolant flows from the coolant inlet 2a to the coolant outlet 2b inside of the fuel cell 2.

Figure 5:
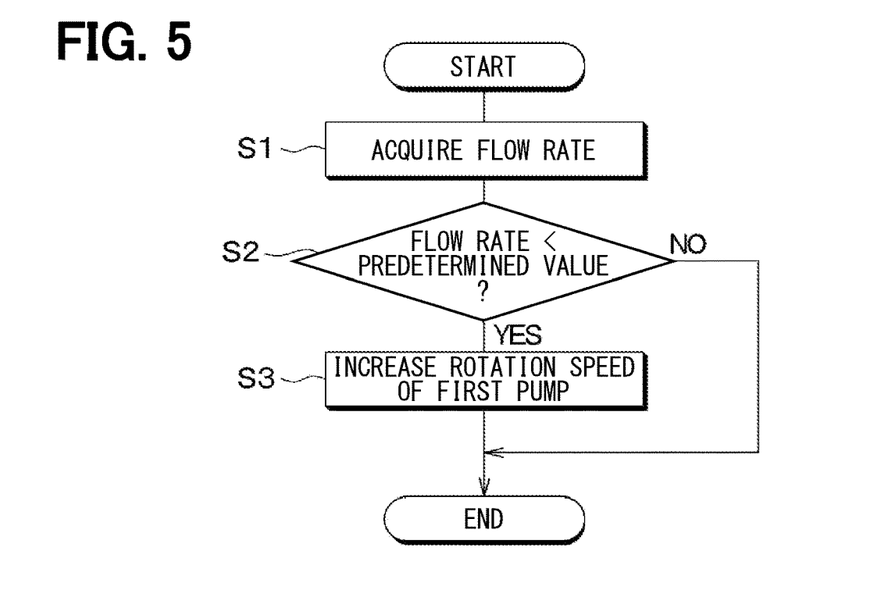
FIG. 5 is a flowchart of a control process executed by a control device of the second embodiment.

Specifically, when the second pump 19 is operating, the control device 21 drives the first pump 18 and repeatedly performs the control process shown in FIG. 5. At the start of operation of the first pump 18, the rotation speed of the first pump 18 is set to a predetermined rotation speed. The steps shown in FIG. 5 correspond to functional units that realize various functions. This also applies to other figures.

In step S1, the control device 21 acquires the flow rate of the coolant flowing through the first passage 16 measured by the flow meter 22.

Subsequently, in step S2, the control device 21 compares the acquired flow rate with a predetermined value, and determines whether the acquired flow rate is smaller than the predetermined value. When the flow direction of the coolant in the first passage 16 is in the forward direction, the flow rate measured by the flow meter 22 is a positive value larger than 0. When the flow direction of the coolant in the first passage 16 is reversed, the flow rate measured by the flow meter 22 is a negative value smaller than 0. Therefore, the predetermined value is set to 0 or a positive value so that the coolant in the first passage 16 flows in the forward direction.

When the determination is YES in step S2, the control device 21 proceeds to step S3 and increases the rotation speed of the first pump 18. After that, the control device 21 temporarily ends the control process shown in FIG. 5. After that, the control device 21 again performs the control process shown in FIG. 5. On the other hand, when the NO determination is made in step S2, the control device 21 temporarily ends the control process shown in FIG. 5. After that, the control device 21 again performs the control process shown in FIG. 5.

Unlike the present embodiment, when the resistor 3 needs to be cooled and the fuel cell 2 does not need to be cooled, the control device 21 drives the second pump 19 to cool the resistor 3, and stops the first pump 18. At this time, a part of the coolant flowing out from the resistor 3 may flow back in the first passage 16.

The backflow of the coolant through the first passage 16 leads to a failure of the first pump 18. Further, in case where a filter for preventing the intrusion of a foreign matter is installed only in the coolant inlet 2a but not provided in the coolant outlet 2b of the fuel cell 2, if the coolant flows back through the first passage 16, the foreign matter cannot be prevented from entering the fuel cell 2. For these reasons, it is preferable that the coolant flows in the first passage 16 in the forward direction.

Therefore, in the present embodiment, as described in steps S2 and S3, the control device 21 increases the rotation speed of the first pump 18 when the flow rate measured by the flow meter 22 is smaller than a predetermined value. In this way, the control device 21 ensures that the flow rate of the coolant flowing through the first passage 16 does not fall below the predetermined value, that is, the flow rate of the coolant flowing through the first passage 16 becomes larger than the predetermined value, by controlling the rotation speed of the first pump 18. As a result, the coolant can flow in the forward direction in the first passage 16. By setting the rotation speed of the first pump 18 to be lower than the rotation speed of the first pump 18 necessary to cool the fuel cell 2, the coolant flows through the first passage 16 at a flow rate lower than the flow rate of the coolant necessary to cool the fuel cell 2.

Although the flow rate is acquired as the measurement result of the flow meter 22 in step S1, the output value of the flow meter 22 before being converted into the flow rate value may be acquired as the measurement result of the flow meter 22. In this case, the predetermined value used in step S2 is set to a value corresponding to the output value of the flow meter 22 when the flow rate of the coolant flowing through the first passage 16 is 0 or the positive value.

Third Embodiment

Figure 6:
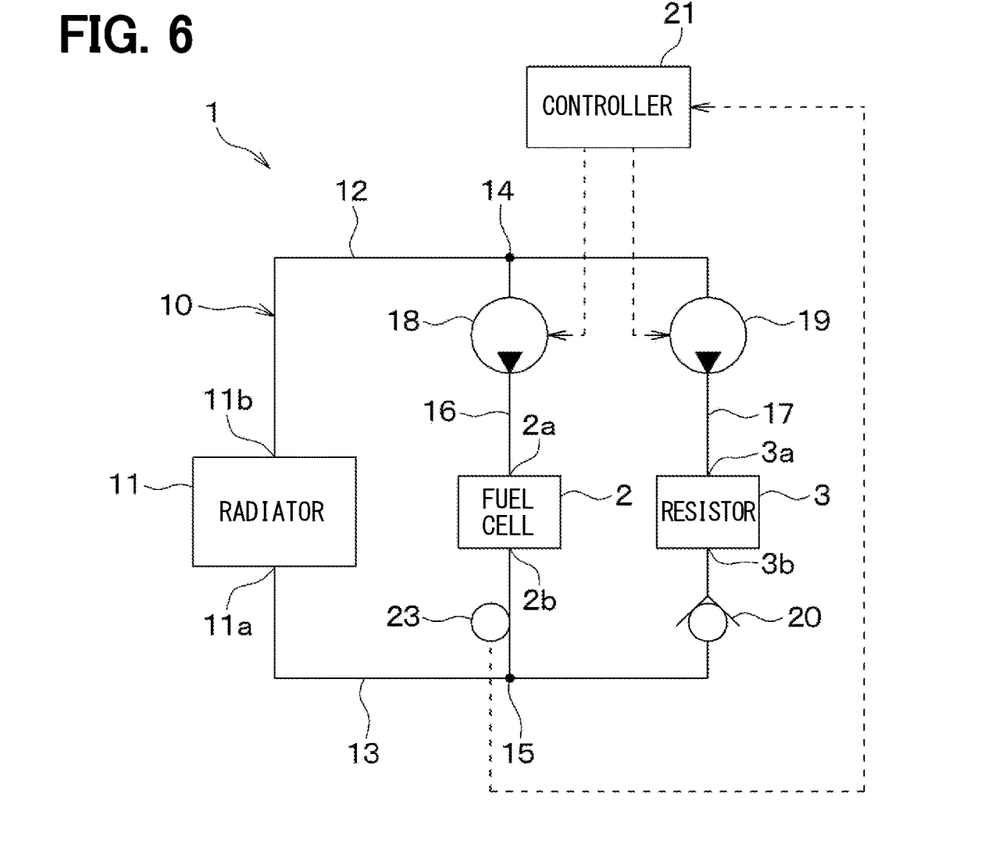
FIG. 6 is a schematic diagram showing a cooling system according to a third embodiment.

As shown in FIG. 6, the cooling system 1 of the present embodiment includes a current meter 23 instead of the flow meter 22 of the second embodiment. The control device 21 performs the control process shown in FIG. 7 instead of the control process shown in FIG. 5 of the second embodiment. Other than these, the third embodiment is the same as the second embodiment.

The current meter 23 measures the flow velocity of the coolant flowing through the first passage 16. The current meter 23 may be of any measurement type such as an electromagnetic type and a laser Doppler type. The current meter 23 is provided at a position between the fuel cell 2 and the confluence portion 15 in the first passage 16. The position where the current meter 23 is provided may be between the first pump 18 and the fuel cell 2 in the first passage 16. Further, the position where the current meter 23 is provided may be between the branch portion 14 and the first pump 18 in the first passage 16. The current meter 23 is connected to the input side of the control device 21. The control device 21 can acquire the measurement result of the current meter 23.

The control device 21 drives the first pump 18 when the second pump 19 is operating, and controls the rotation speed of the first pump 18 based on the measurement result of the current meter 23 so that the coolant flows in the first passage 16 in the forward direction. Specifically, when the second pump 19 is operating, the control device 21 operates the first pump 18 and repeatedly performs the control process shown in FIG. 7.

Figure 7:
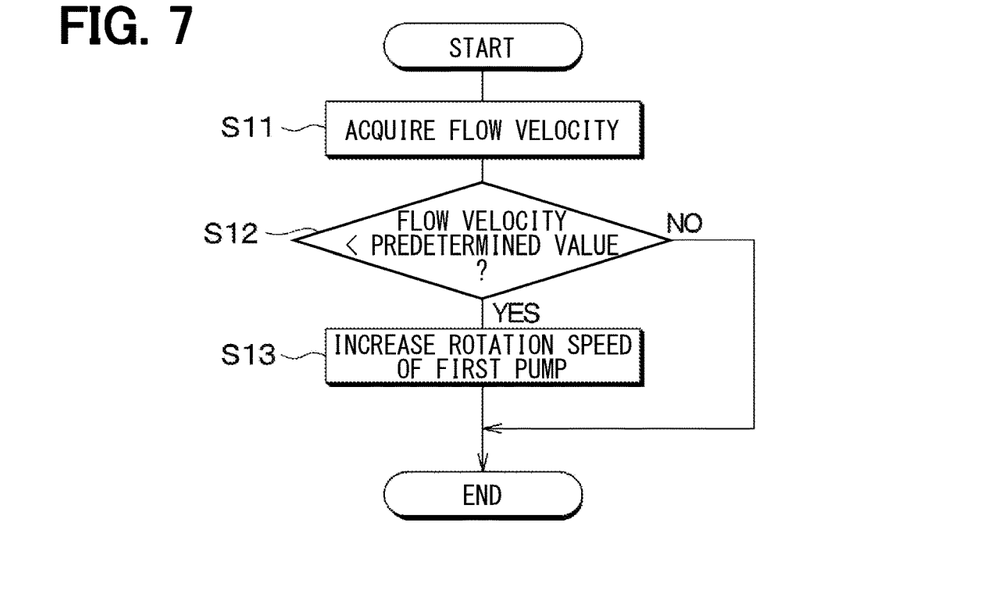
FIG. 7 is a flowchart of a control process executed by a control device of the third embodiment.

As shown in FIG. 7, in step S11, the control device 21 acquires the flow velocity of the coolant flowing through the first passage 16 measured by the current meter 23.

Subsequently, in step S12, the control device 21 compares the acquired flow velocity with a predetermined value, and determines whether the acquired flow velocity is smaller than the predetermined value. When the flow direction of the coolant in the first passage 16 is in the forward direction, the flow velocity measured by the current meter 23 is a positive value larger than 0. When the flow direction of the coolant in the first passage 16 is reversed, the flow velocity measured by the current meter 23 has a negative value smaller than 0. When there is no flow of the coolant in the first passage 16, the flow velocity measured by the current meter 23 becomes 0. Therefore, the predetermined value is set to 0 or a positive value so that the coolant in the first passage 16 flows in the forward direction.

When the determination is YES in step S12, the control device 21 proceeds to step S13 and increases the rotation speed of the first pump 18. After that, the control device 21 temporarily ends the control process shown in FIG. 7. After that, the control device 21 again performs the control process shown in FIG. 7. On the other hand, when the NO determination is made in step S12, the control device 21 temporarily ends the control process shown in FIG. 7. After that, the control device 21 again performs the control process shown in FIG. 7.

As described in steps S12 and S13, the control device 21 increases the rotation speed of the first pump 18 when the flow velocity measured by the current meter 23 is smaller than a predetermined value. In this way, the control device 21 ensures that the flow velocity of the coolant flowing through the first passage 16 does not fall below the predetermined value, that is, the flow velocity of the coolant flowing through the first passage 16 becomes larger than the predetermined value, by controlling the rotation speed of the first pump 18. As a result, the same effect as that of the second embodiment can be obtained.

Fourth Embodiment

Figure 8:
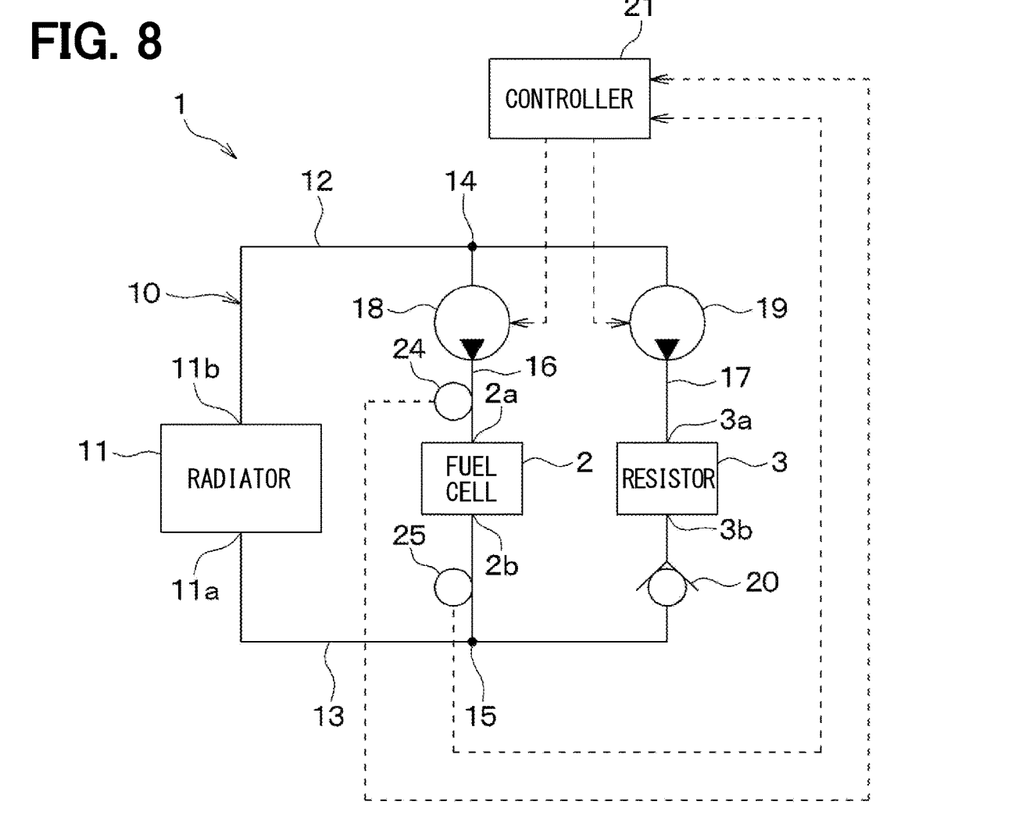
FIG. 8 is a schematic diagram showing a cooling system according to a fourth embodiment.

As shown in FIG. 8, the cooling system 1 of the present embodiment includes a first pressure sensor 24 and a second pressure sensor 25 in place of the flow meter 22 of the second embodiment. The control device 21 performs the control process shown in FIG. 9 instead of the control process shown in FIG. 5 of the second embodiment. Other than these, the fourth embodiment is the same as the second embodiment.

The first pressure sensor 24 and the second pressure sensor 25 measure the pressure of the coolant at two distant points in the first passage 16. The first pressure sensor 24 and the second pressure sensor 25 are provided at two locations on the downstream side of the outlet of the first pump 18 in a flow of the coolant in the first passage 16. Specifically, the first pressure sensor 24 is provided at a position between the outlet of the first pump 18 and the coolant inlet 2a of the fuel cell 2 in the first passage 16. The second pressure sensor 25 is provided at a position between the coolant outlet 2b of the fuel cell 2 and the confluence portion 15 in the first passage 16. In this way, the second pressure sensor 25 is arranged away from the first pressure sensor 24 on the downstream side in a flow of the coolant when the coolant flows in the forward direction through the first passage 16.

The first pressure sensor 24 and the second pressure sensor 25 are connected to the input side of the control device 21. The control device 21 can acquire the measurement results of the first pressure sensor 24 and the second pressure sensor 25.

When the second pump 19 is operating, the control device 21 drives the first pump 18 and controls the rotation speed of the first pump 18 based on the measurement result of the first pressure sensor 24 and the second pressure sensor 25. Specifically, the control device 21 controls the rotation speed of the first pump 18 based on a relationship between the magnitude relationship of the first pressure value and the second pressure value, and the flow direction of the coolant in the first passage 16, such that the coolant flows in the forward direction in the first passage 16. Specifically, when the second pump 19 is operating, the control device 21 operates the first pump 18 and repeatedly performs the control process shown in FIG. 9.

Figure 9:
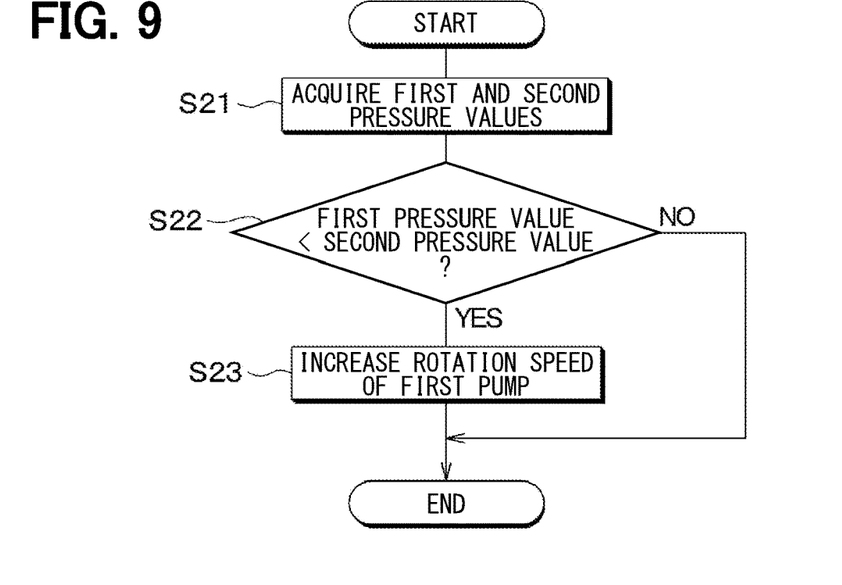
FIG. 9 is a flowchart of a control process executed by a control device of the fourth embodiment.

As shown in FIG. 9, in step S21, the control device 21 acquires the first pressure value measured by the first pressure sensor 24 and the second pressure value measured by the second pressure sensor 25.

Subsequently, in step S22, the control device 21 compares the first pressure value and the second pressure value acquired in step S21, and determines whether the first pressure value is smaller than the second pressure value. Here, when the flow direction of the coolant in the first passage 16 is in the forward direction, the first pressure value is larger than the second pressure value. When the flow direction of the coolant in the first passage 16 is reversed, the first pressure value is smaller than the second pressure value. These are the relationship between the magnitude relationship of the first pressure value and the second pressure value and the flow direction of the coolant in the first passage 16.

When the determination is YES in step S22, the control device 21 proceeds to step S23 and increases the rotation speed of the first pump 18. After that, the control device 21 temporarily ends the control process shown in FIG. 9. After that, the control device 21 again performs the control process shown in FIG. 9. On the other hand, when the NO determination is made in step S22, the control device 21 temporarily ends the control process shown in FIG. 9. After that, the control device 21 again performs the control process shown in FIG. 9.

As described in steps S22 and S23, the control device 21 increases the rotation speed of the first pump 18 when the first pressure value is smaller than the second pressure value. In this way, the control device 21 controls the rotation speed of the first pump 18 so that the first pressure value becomes larger than the second pressure value. As a result, the same effect as that of the second embodiment can be obtained.

The positions where the first pressure sensor 24 and the second pressure sensor 25 are provided may be other positions while being located at two locations on the downstream side of the outlet of the first pump 18 in a flow of the coolant in the first passage 16. Further, the positions where the first pressure sensor 24 and the second pressure sensor 25 are provided may be any two positions on the upstream side of the inlet of the first pump 18 in a flow of the coolant in the first passage 16.

Fifth Embodiment

Figure 10:
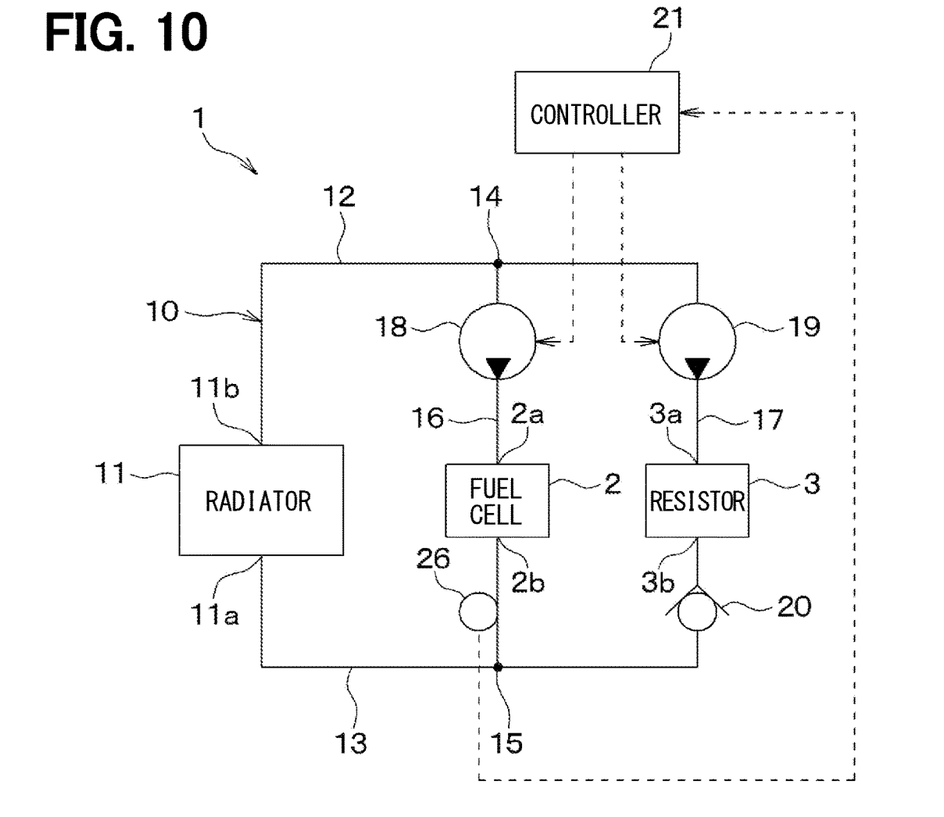
FIG. 10 is a schematic diagram showing a cooling system according to a fifth embodiment.

As shown in FIG. 10, the cooling system 1 of the present embodiment includes a differential pressure sensor 26 instead of the flow meter 22 of the second embodiment. The control device 21 performs the control process shown in FIG. 11 instead of the control process shown in FIG. 5 of the second embodiment. Other than these, the fifth embodiment is the same as the second embodiment.

The differential pressure sensor 26 measures the difference in pressure between the coolants at two distant locations in the first passage 16, that is, the differential pressure. The differential pressure sensor 26 is provided at a position between the coolant outlet 2b of the fuel cell 2 and the confluence portion 15 in the first passage 16. The position where the flow meter 22 is provided may be provided at another position in the first passage 16.

The differential pressure sensor 26 is connected to the input side of the control device 21. The control device 21 can acquire the measurement result of the differential pressure sensor 26. The control device 21 drives the first pump 18, when the second pump 19 is operating, and controls the rotation speed of the first pump 18 based on the measurement result of the differential pressure sensor 26, specifically, a relationship between the magnitude of the differential pressure and the flow direction of the coolant in the first passage 16, so that the coolant flows in the forward direction in the first passage 16. Specifically, when the second pump 19 is operating, the control device 21 drives the first pump 18 and repeatedly performs the control process shown in FIG. 11.

Figure 11:
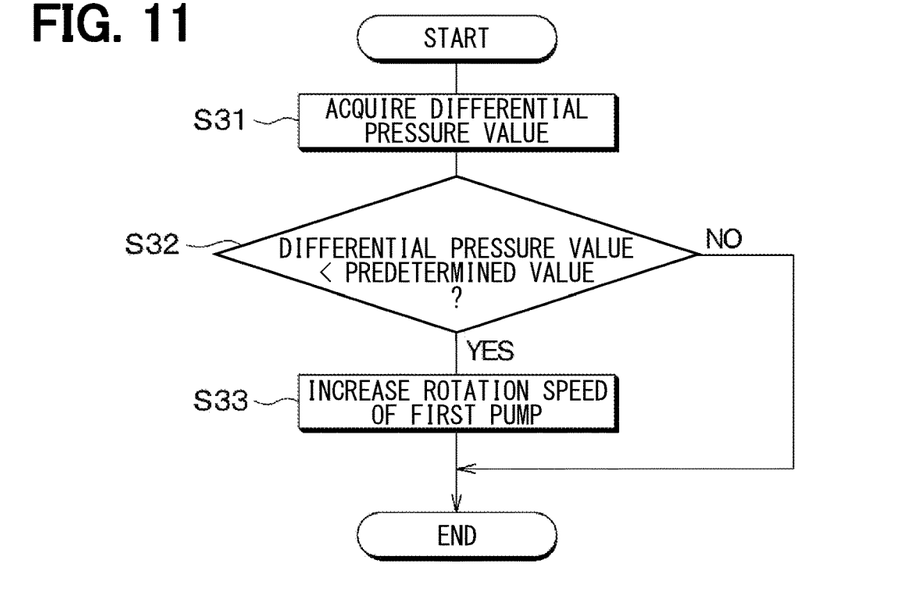
FIG. 11 is a flowchart of a control process executed by a control device of the fifth embodiment.

As shown in FIG. 11, in step S31, the control device 21 acquires the differential pressure value measured by the differential pressure sensor 26.

Subsequently, in step S32, the control device 21 compares the differential pressure value acquired in step S21 with a predetermined value, and determines whether the differential pressure value is smaller than the predetermined value. Here, when the flow direction of the coolant in the first passage 16 is in the forward direction, the differential pressure value measured by the differential pressure sensor 26 is a positive value larger than 0. When the flow direction of the coolant in the first passage 16 is reversed, the differential pressure value measured by the differential pressure sensor 26 is a negative value smaller than 0. These are the relationship between the magnitude of the differential pressure and the flow direction of the coolant in the first passage 16. Therefore, the predetermined value is set to 0 or a positive value so that the coolant in the first passage 16 flows in the forward direction.

When the determination is YES in step S32, the control device 21 proceeds to step S33 and increases the rotation speed of the first pump 18. After that, the control device 21 temporarily ends the control process shown in FIG. 11. After that, the control device 21 again performs the control process shown in FIG. 11. On the other hand, when the NO determination is made in step S22, the control device 21 temporarily ends the control process shown in FIG. 11. After that, the control device 21 again performs the control process shown in FIG. 11.

As described in steps S32 and S33, the control device 21 increases the rotation speed of the first pump 18 when the differential pressure value measured by the differential pressure sensor 26 is smaller than a predetermined value. In this way, the control device 21 prevents the differential pressure value of the coolant flowing through the first passage 16 from falling below the predetermined value, that is, the differential pressure value of the coolant flowing through the first passage 16 is greater than the predetermined value, by controlling the rotation speed of the first pump 18. As a result, the same effect as that of the second embodiment can be obtained.

Sixth Embodiment

Figure 12:
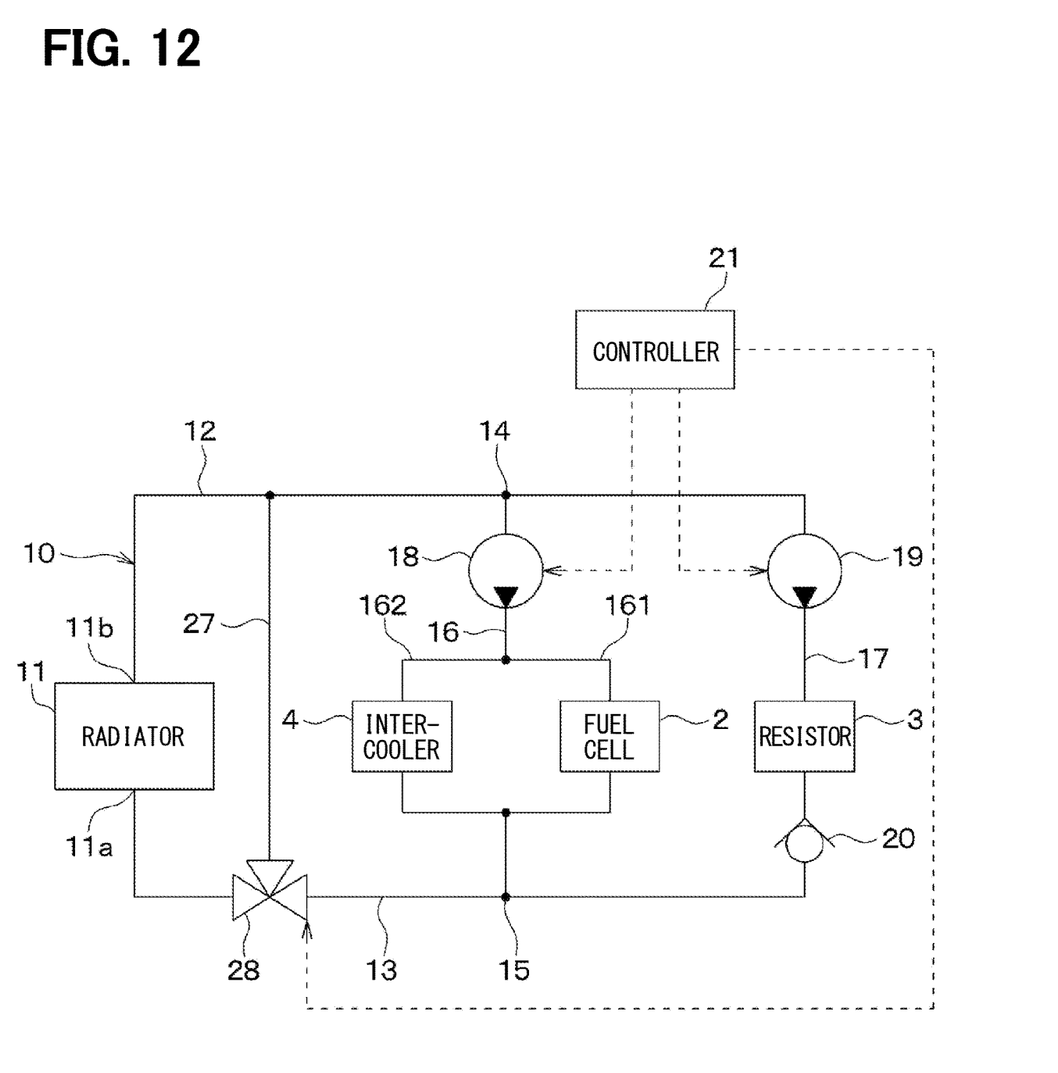
FIG. 12 is a schematic diagram showing a cooling system according to a sixth embodiment.

As shown in FIG. 12, the present embodiment differs from the first embodiment in that the cooling system 1 includes an intercooler 4, a bypass passage 27, and a distribution valve 28. Other configurations of the cooling system 1 are the same as those of the first embodiment.

The intercooler 4 cools air pumped from an air pump (not shown) to the fuel cell 2 with a coolant. The air pumped by the air pump is compressed and warmed up. The intercooler 4 is connected in parallel with the fuel cell 2 between the first pump 18 and the confluence portion 15 in the first passage 16.

More specifically, the first passage 16 includes a third passage 161 and a fourth passage 162 arranged in parallel between the first pump 18 and the confluence portion 15. The fuel cell 2 is arranged in the middle of the third passage 161. The intercooler 4 is arranged in the middle of the fourth passage 162.

The bypass passage 27 bypasses the radiator 11 to allow the coolant flowing out of the fuel cell 2 to bypass the radiator 11. One end of the bypass passage 27 is connected in the middle of the inlet passage 13. The other end of the bypass passage 27 is connected in the middle of the outlet passage 12.

The distribution valve 28 distributes the coolant flowing out of the fuel cell 2 to the radiator 11 and the bypass passage 27, and controls a flow rate of the coolant flowing through the radiator 11 and a flow rate of the coolant flowing through the bypass passage 27. The distribution valve 28 is provided at a connection portion between the one end of the bypass passage 27 and the inlet passage 13.

The distribution valve 28 is electrically connected to the output side of the control device 21. The control device 21 controls the operation of the distribution valve 28 for adjusting the temperature of the fuel cell 2. By controlling the operation of the distribution valve 28, the flow rate of the coolant flowing through the radiator 11 and the flow rate of the coolant flowing through the bypass passage 27 are adjusted. The temperature of the fuel cell 2 is adjusted to an appropriate temperature.

The same effect as that of the first embodiment can be obtained by the same configuration as that of the first embodiment also in this embodiment. Further, the second to fifth embodiments can be applied to the present embodiment. As a result, the same effect as that of the second to fifth embodiments can be obtained.

Other Embodiments (1) In each of the embodiments, the check valve 20 is used as a backflow preventer. Alternatively, an on-off valve may be used as a backflow preventer. In this case, when the second pump 19 is stopped, the on-off valve is closed. As a result, the backflow of the coolant in the second passage 17 is prevented when the second pump 19 is stopped and the first pump 18 is operated.

(2) In each of the embodiments, the radiator 11 exchanges heat between the coolant and air. Alternatively, a heat exchanger that exchanges heat between the coolant and a refrigerant of a refrigeration cycle may be used as the radiator.

(3) In each of the embodiments, the first pump 18 is provided on the upstream side of the fuel cell 2 in a flow of the coolant in the first passage 16. However, the first pump 18 may be provided on the downstream side of the fuel cell 2 in a flow of the coolant in the first passage 16. Similarly, the second pump 19 may be provided on the downstream side of the resistor 3 in a flow of the coolant in the second passage 17.

(4) The cooling system of each of the embodiments is mounted on a large commercial vehicle equipped with the fuel cell 2. However, the cooling system may be mounted on a passenger car equipped with the fuel cell 2. Further, the cooling system is not limited to be mounted on the passenger car and the commercial vehicle, and may be mounted on other vehicles having wheels and traveling on land, such as railroad vehicles, industrial vehicles used for cargo handling and transportation, construction vehicles used for construction, agricultural vehicles used for agriculture, and the like. Further, the electric power generated by the fuel cell 2 may be used for other than driving the motor generator mounted on the vehicle.

(5) The present disclosure is not limited to the foregoing description of the embodiments and can be modified within the scope of the present disclosure. The present disclosure may also be varied in many ways. Such variations are not to be regarded as departure from the disclosure, and all such modifications are intended to be included within the scope of the disclosure. The embodiments described above are not independent of each other, and can be appropriately combined except when the combination is obviously impossible. Further, in each of the embodiments, it goes without saying that components of the embodiment are not necessarily essential except for a case in which the components are particularly clearly specified as essential components, a case in which the components are clearly considered in principle as essential components, and the like.

(6) The control device and the technique according to the present disclosure may be achieved by a dedicated computer provided by constituting a processor and a memory programmed to execute one or more functions embodied by a computer program. Alternatively, the control device and the technique according to the present disclosure may be achieved by a dedicated computer provided by constituting a processor with one or more dedicated hardware logic circuits. Alternatively, the control device and the method described in the present disclosure may be implemented by one or more special purpose computer, which is configured as a combination of a processor and a memory, which are programmed to perform one or more functions, and a processor which is configured with one or more hardware logic circuits. The computer program may be stored in a computer-readable non-transitory tangible storage medium as an instruction executed by a computer.

What is claimed is:

1. A cooling system configured to cool a fuel cell for a vehicle comprising:
    a radiator configured to radiate heat of a coolant, the radiator having a radiator inlet for a coolant to flow in and a radiator outlet for a coolant to flow out;
    an outlet passage connected to the radiator outlet for the coolant to flow out of the radiator outlet;
    an inlet passage connected to the radiator inlet for the coolant to flow in the radiator inlet;
    a branch portion provided in the outlet passage for branching into a plurality of passages for a coolant;
    a confluence portion provided in the inlet passage for merging the plurality of passages into one passage;
    a first passage and a second passage, as the plurality of passages, connected in parallel with each other between the branch portion and the confluence portion, a coolant flowing from the branch portion toward the confluence portion;
    a fuel cell provided in the first passage, the fuel cell having a fuel cell inlet for a coolant to flow in and a fuel cell outlet for a coolant to flow out, a coolant flowing inside the fuel cell, the fuel cell generating electric power by an electrochemical reaction of fuel;
    a first pump provided in the first passage to pump a coolant;
    a resistor provided in the second passage for a brake, the resistor having a resistor inlet for a coolant to flow in and a resistor outlet for a coolant to flow out, a coolant flowing inside the resistor, the resistor converting an electric power generated by a motor generator into a heat energy by a braking operation to rotation of a wheel mechanically connected to the motor generator;
    a second pump provided in the second passage to pump a coolant; and
    a backflow preventer provided in the second passage as a mechanical component different from the second pump, so as to prevent a coolant from flowing inside the resistor in a reverse direction from the resistor outlet to the resistor inlet, wherein
    the first passage has no backflow preventer, as a mechanical component different from the first pump, which prevents a coolant from flowing inside the fuel cell in a reverse direction from the fuel cell outlet to the fuel cell inlet.

2. The cooling system according to claim 1, further comprising: a control device configured to control the first pump and the second pump, wherein
    the control device drives the first pump when the second pump is operating, and controls a rotation speed of the first pump such that a coolant flows through the first passage in a forward direction from the fuel cell inlet to the fuel cell outlet inside the fuel cell.

* * * * *

UNITED STATES PATENT AND TRADEMARK OFFICE
CERTIFICATE OF CORRECTION

| | | |
|---|---|---|
| PATENT NO. | : 12,412,909 B2 | Page 1 of 1 |
| APPLICATION NO. | : 17/857530 | |
| DATED | : September 9, 2025 | |
| INVENTOR(S) | : Kentaro Fukuda | |

It is certified that error appears in the above-identified patent and that said Letters Patent is hereby corrected as shown below:

On the Title Page

At item (71), the second listed Applicant:
HINO MOTORS, LTD., Hino (JP)

Should be listed as:
HINO MOTORS, LTD., Tokyo (JP)

Signed and Sealed this
Fourteenth Day of October, 2025

John A. Squires
*Director of the United States Patent and Trademark Office*